United States Patent
Long et al.

[19]

[11] Patent Number: 5,991,311
[45] Date of Patent: Nov. 23, 1999

[54] TIME-MULTIPLEXED TRANSMISSION ON DIGITAL-SUBSCRIBER LINES SYNCHRONIZED TO EXISTING TCM-ISDN FOR REDUCED CROSS-TALK

[75] Inventors: Guozhu Long, Newark; Anthony J. P. O'Toole, San Jose, both of Calif.

[73] Assignee: Centillium Technology, Fremont, Calif.

[21] Appl. No.: 08/958,763

[22] Filed: Oct. 25, 1997

[51] Int. Cl.⁶ ..................................... H04J 3/12
[52] U.S. Cl. .......................................... 370/524
[58] Field of Search ................... 370/201, 524; 379/90.01, 100.15, 88.17, 242, 399, 417; 455/295; 345/58; 386/22

[56] References Cited

U.S. PATENT DOCUMENTS 5,410,343  4/1995  Coddington et al. ................. 348/7
5,831,979  11/1998  Byers ................................ 370/360
5,848,141  12/1998  Yaker ............................... 379/215

OTHER PUBLICATIONS

TP3401 DASL Data Sheet, National Semiconductor, pp. 1–16, Dec. 1991.

*Primary Examiner*—Huy D. Vu
*Assistant Examiner*—Alexander Boakye
*Attorney, Agent, or Firm*—Stuart T. Auvinen

[57] ABSTRACT

Pulp-insulated telephone cables common in Japan and other countries have higher cross-talk interference than plastic-insulated cables common in the United States. Deployment of newer xDSL systems in Japan has been limited by the high cross-talk interference in those pulp cables, especially the near-end cross-talk (NEXT) from ISDN services using time-compression multiplexing (TCM). A TCM-DSL that can share pulp-cable bundles with TCM ISDN lines eliminates the NEXT interference by synchronizing transmission and reception with the TCM ISDN equipment for the same cable bundle. The TCM-DSL line uses TCM that is synchronized with the ISDN transmit and receive windows so that the TCM-DSL is transmitting but not receiving when the ISDN modems at the same side are transmitting. When ISDN at the same side are receiving and not transmitting, NEXT interference does not exist. Thus higher-speed TCM-DSL data can be received during the ISDN receive windows with reduced interference. A passband modulation technique such as Carrierless-amplitude/phase modulation (CAP) with advanced signal processing techniques such as trellis encoding and pre-coding achieve higher data rates for TCM-DSL. The TCM-DSL transmitted signal occupies a pass-band that is separate from a low-frequency POTS band for voice-band services. The voice calls use full-duplex continuously without regard to the TCM-DSL data transmitted simultaneously with the POTS voice calls over the same phone line. TCM-DSL is synchronized to an ISDN clock that is routed to the TCM-DSL line card, or a burst-timing extractor that detects burst timing from either the ISDN line signal or cross-talk from the ISDN line signals.

19 Claims, 11 Drawing Sheets

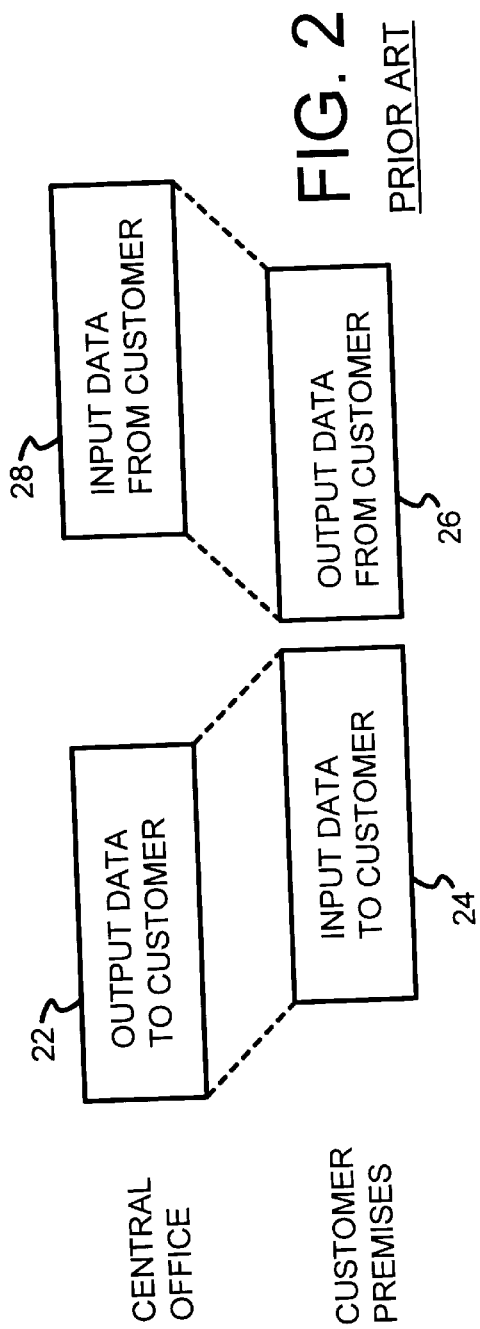
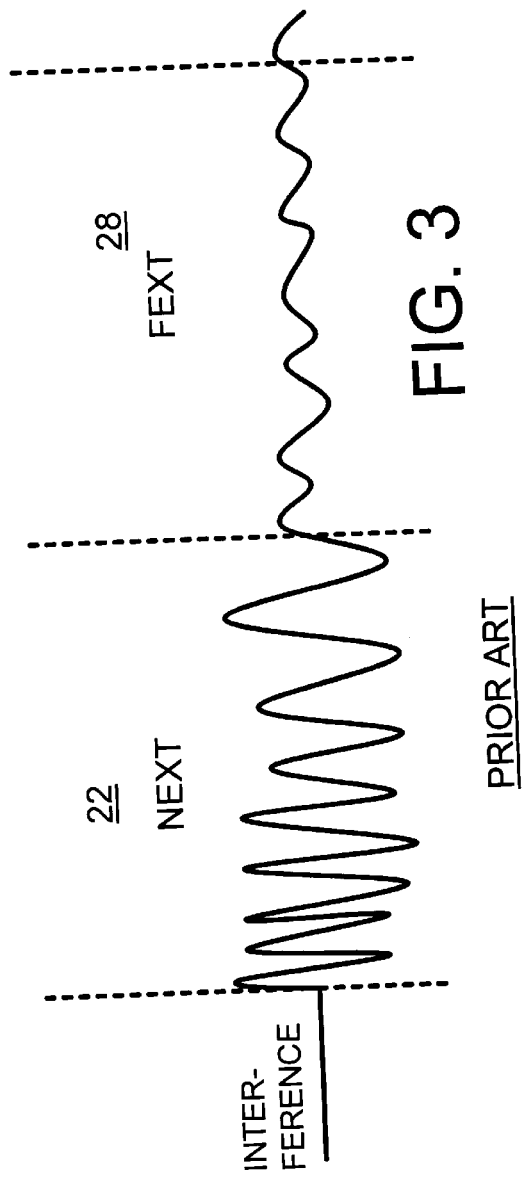

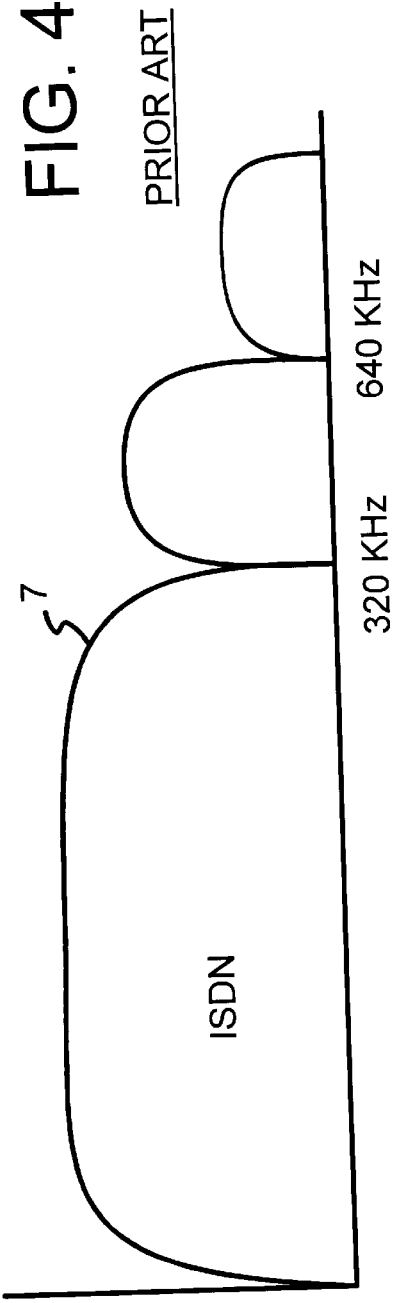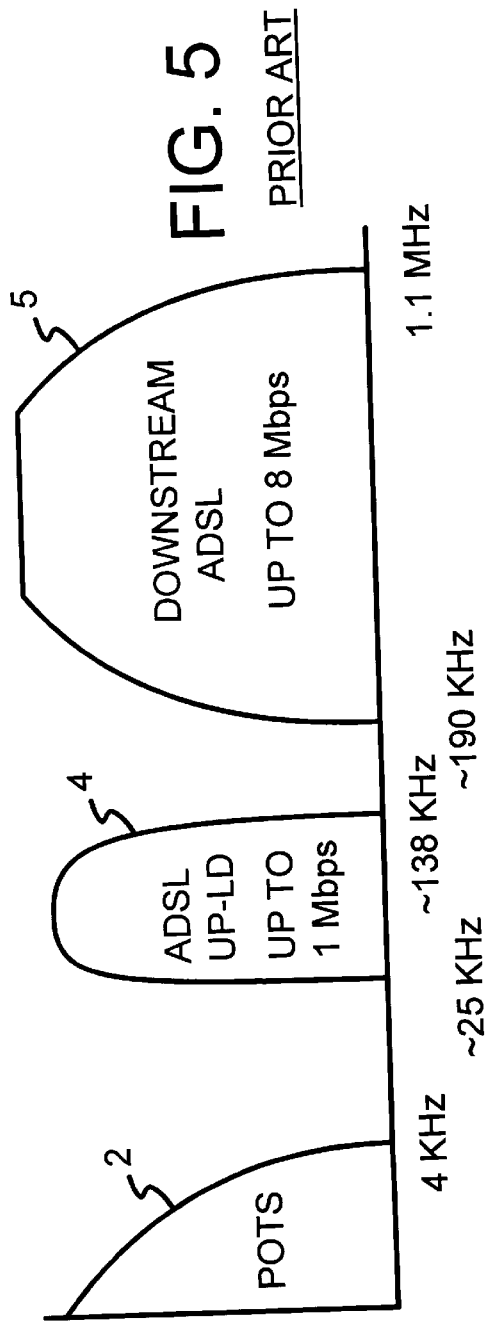

TIME-MULTIPLEXED TRANSMISSION ON DIGITAL-SUBSCRIBER LINES SYNCHRONIZED TO EXISTING TCM-ISDN FOR REDUCED CROSS-TALK

BACKGROUND OF THE INVENTION—FIELD OF THE INVENTION

This invention relates to high-speed modems over telephone subscriber loops, and more particularly to digital-subscriber-loop (DSL) modems using a frequency-band higher than that used by Plain Old Telephone Service (POTS) equipment.

BACKGROUND OF THE INVENTION— DESCRIPTION OF THE RELATED ART

The demand for modem transmission speed continues to soar as more telephone customers in more countries of the Earth send more and more data traffic over phone lines. While it is feasible to run high-speed fiber-optic cable to some new customers, existing customers are connected to the phone system by slower coppers wires such as untwisted or twisted-pair lines. The cost of replacing all existing copper wires with higher-speed fiber-optic cable is prohibitive. Thus, higher-bandwidth technologies that use the existing copper-cable phone lines are desirable.

Basic rate Integrated Services Digital Network (ISDN) boosted data rates over existing copper phone lines to 128 kbps. Special termination and conditioning of the existing copper phone lines is required for ISDN.

Digital-Subscriber-Line or Loop (DSL) modems are now becoming available. Several variations of DSL technology (referred to generically as xDSL) are being explored, such as HDSL, RADSL, VDSL, and ADSL. ADSL (asymmetric DSL) is particularly attractive for consumer Internet applications where most of the data traffic is downloaded to the customer. Upstream bandwidth for uploading data can be reduced to increase downstream bandwidth since most Internet traffic is downstream traffic. ADSL provides a bandwidth of up to 8 Mbps in the downstream direction, or up to 2 Mbps if symmetric DSL is used. See U.S. Pat. Nos. 5,461,616, 5,534,912, and 5,410,343 for descriptions of ADSL technology.

Cross-talk Using Pulp Cables Limits DSL

The wider bandwidth required for DSL transmission creates higher cross-talk interference among copper pairs in the same cable-binder group. The level of the crosstalk varies for different cable structures and materials. In particular, some countries such as Japan and Korea use telephone cables with a paper-based "pulp" insulator rather than the plastic-insulated cables (PIC) used in the United States. These pulp cables produce much more cross-talk interference than the PIC cables. Thus it is more difficult to deploy wide-band DSL services in those countries since their existing telephone cables are prone to cross-talk interference.

FIG. 1 shows the problem of interference from existing ISDN lines. Central office 8 contains several Integrated Services Digital Network (ISDN) line cards 14 that connect the telephone network backbone to local lines 20 that are strung to the customer premises equipment. Remote ISDN terminal adapters or modems 12 are located at different remote customer sites within a few kilometers of central office 8.

Local lines from ISDN line cards 14 to remote ISDN modems 12 are usually routed through one or more cable bundles 18. These telephone-cable bundles 18 may contain dozens or more separate telephone lines or copper pairs. Standard voice services, ISDN services, and newer DSL services often must share the same cable bundle. Since lines run close to other lines in cable bundles 18 for long distances, mutual inductances can create cross-talk interference or noise on lines 20.

For voice services such as Plain-old-telephone service (POTS), the frequencies are low, so interference is negligible. ISDN digital services use a higher bandwidth of around 80 to 320 kHz. Interference begins to cause problems at ISDN frequencies. New xDSL services usually use even higher bandwidths. For example, ADSL bandwidths are usually above 1 MHz and have significant cross-talk problems. Cross-talk from other digital services such as older ISDN and T1 in a cable bundle can severely restrict xDSL speeds.

Due to different cross-talk interference characteristics, different line codes are used for basic rate ISDN. In countries such as the U.S., where better-insulated PIC cables are used, full-duplex data transmission with echo cancellation (ITU-T G.961, Appendix II, or T1.601) is deployed. Echo cancellation by the receivers removes the echo by the locally-transmitted signal so that the remotely transmitted signal can be received. Thus both ends of the line can transmit simultaneously.

Japan Uses Half-Duplex ISDN

In countries such as Japan, where the noisy pulp cables are installed, a different ISDN system (ITU-T G.961, Appendix III) is often deployed. To eliminate the near-end cross-talk (NEXT) interference, time-compression multiplexing (TCM) ISDN is used rather than echo-cancellation full-duplex. In such a system, the ISDN line cards at the central office are synchronized so that they all transmit at the same time. The ISDN line cards all receive during a different time period. Thus near-end cross-talk interference during reception is eliminated since none of the other ISDN modems at the same side are transmitting during the reception time-period. Although far-end crosstalk still exists, it is usually much weaker than the near-end cross-talk.

FIG. 2 is a timing diagram for a TCM ISDN line. During time period or window 22, data is output from the central office to the remote ISDN modem at the customer premises. This data arrives at the remote modem after a delay, during reception window 24. The customer premises ISDN equipment uses a burst clock detector to determine the timing of the receive downstream burst and to generate the timing for it's transmit upstream burst. A pause occurs when no data is transmitted. This pause is sometimes called the turn-around period. During period 26, upstream data is transmitted from the remote modem to the central office, which arrives at the central office after a delay, during window 28.

At any particular time, only one end of the TCM-ISDN line is transmitting, while the other end is receiving. Echo cancellation is not needed since the echo of the transmitted signal does not have to be removed. Since each side transmits in slightly less than half of the time, to obtain the same average data rate, the data rate during transmission has to be about doubled. This translates to a higher frequency bandwidth, which in turn creates more cross-talk. While such a TCM ISDN system has been effective for reducing cross-talk in the TCM ISDN system itself, it is difficult to add newer xDSL systems in the same cable bundle because of the cross-talk from the these ISDN lines.

Synchronized ISDN Lines Create Interference for xDSL

Newer xDSL services, such as HDSL and ADSL, use full-duplex transmission based on frequency-divisionduplex or echo cancellation. Therefore, the receiver at either side receives all the time. If such an xDSL modem is installed in the same cable bundle as the TCM ISDN, the strong near-end cross-talk during the transmission time for the same-side TCM ISDN modems will severely affect the reception of the xDSL signal.

FIG. 3 is a diagram of interference at a central office from several ISDN lines transmitting in synchronization. During transmit window 22, a burst of data is sent from the central office to the remote sites. Near-end crosstalk interference (NEXT) is particularly strong during transmit window 22, since the ISDN devices at the central office are all transmitting. During receive time window 28, these ISDN devices at the central office are not transmitting. Interference is primarily far-end-crosstalk (FEXT) which is weaker than NEXT since it is attenuated by the length of the telephone line.

TCM ISDN Transmitters Often Poorly Filtered—FIG. 4

FIG. 4 is a transmitting-signal spectrum of a TCM ISDN modem. For a background on a TCM ISDN telephone system, see U.S. Pat. No. 5,265,088 by Takigawa et al., and assigned to Fujitsu Ltd. and Nippon Telegraph and Telephone Corp. This coding scheme uses pulse-amplitude modulation (PAM) with alternate-mark inversion (AMI). In this scheme, a binary zero is represented by no pulse, and a binary one by a positive or a negative pulse. Each symbol carries only one bit. The ISDN lines are designed to operate over a frequency range of zero (D.C.) to about 320 kHz. Since ISDN operates down to zero Hertz, no lower band is available for POTS voice calls.

ISDN signals decay slowly above 320 kHz. The higher harmonics are not necessary to carry information, but they are often not filtered by the transmitter to a low level, resulting in this long, high-frequency tail. When ISDN was first deployed, the upper frequencies were not used by other devices, so interference in the higher bands was not a problem. However, it is a severe problem for newer xDSL services that use the higher-frequency band.

ISDN Interferes With xDSL—FIG. 5

The wide bandwidth used by ISDN, as shown in FIG. 4, severely hampers deployment of higher-bandwidth xDSL where the poorly-insulated pulp cables are common. FIG. 5 is a diagram of the partitioning of frequency bands for ADSL (T1.413) service using frequency-division duplex and voice calls. FIGS. 4 and 5 are not drawn with a linear scale. Plain-old-telephone service (POTS) voice calls are transmitted over low-frequency POTS band 2, as they are for standard telephone lines. POTS band 2 operates from near D.C. to 4 kHz. Since this is the same frequency range as standard telephones, ordinary telephone equipment or voice-band modems can be used over POTS band 2.

ADSL upstream channel 4 is for uploads from the customer, or for sending commands and user input from the customer to the central office side. Some embodiments may use a bi-directional channel in place of upstream channel 4. Upstream channel 4 operates at up to 138 kHz, with the data rate up to 1 Mbps.

Wide-band 5 carries the bulk of the ADSL-line bandwidth. Wide-band 5 carries ADSL data downstream to the customer at up to 8 Mbps. Wide-band 5 is a frequency band typically from 140–200 kHz up to about 1.1 MHz. The lowest frequencies are reserved for POTS. Other kinds of DSL use different frequency bands, but all use relatively high frequency bands.

A comparison of FIGS. 4 and 5 shows that the TCM ISDN band overlaps both lower frequency upstream band 4 and the high-frequency downstream band 5. Interference from ISDN is generated in these frequency bands used by ADSL and other forms of xDSL, and vice versa. Lower-quality cables such as pulp cables do not sufficiently insulate ISDN lines from ADSL lines.

What is desired is an xDSL system that can be added to an existing telephone cable system. It is desired to use high-bandwidth DSL even with inferior pulp cables. It is further desired for existing TCM ISDN services to co-exist with new DSL services in a common cable bundle. It is desired to reduce interference from existing TCM ISDN services to new higher-bandwidth DSL services added to the copper wires in the same cable bundle. An xDSL system suitable for such a telephone system is desired.

SUMMARY OF THE INVENTION

A Digital-Subscriber-Line (DSL) system for high-speed data transmission uses passband modulation over a copper-pair telephone line. It reduces an effect of crosstalk interference with Integrated Services Digital Network (ISDN) on closely-located copper pairs. The ISDN devices are Time Compression Multiplexing (TCM) systems that transmit data from a central office side but not from remote sites during a downstream time-window. The ISDN devices receive but not transmit at the central office side during an upstream time-window.

The DSL system has a central-office-side device with a data network interface to a data network. A burst-clock input receives a burst clock that indicates the downstream time-window when the ISDN devices at the central office side are transmitting from the central office side to the remote sites. It also indicates the upstream time-window when the ISDN devices at the central office side are receiving remotely-transmitted data from the remote sites.

A telephone-line interface connects to a copper-pair telephone line connected to customer-premises DSL equipment at a remote customer site. The copper-pair telephone line is a DSL line shares a cable bundle with TCM-ISDN lines driven by the ISDN devices.

A DSL processor is coupled to the telephone-line interface, to the data-network interface, and to the burst clock input. It receives the burst clock synchronized to the TCM-ISDN lines. The burst clock controls the DSL processor to transmit during the downstream time-window and receive during the upstream time-window. The DSL processor receives a data stream from the data network and generates a downstream passband signal to represent the data stream. The DSL processor transmits the downstream passband signal to the customer-premises DSL equipment at the remote customer site over the DSL line. The DSL processor receives an upstream passband signal from the customer-premises DSL equipment extracts from the upstream passband signal a represented data signal for transmission to the data network.

The DSL system provides a higher data rate than the ISDN devices but the DSL system is synchronized to the IDSN devices to reduce the effect of the crosstalk interference.

In further aspects customer-premises DSL equipment at the remote customer site has a remote telephone-line interface that connects to the copper-pair telephone line that is connected to the central-office-side device. The copper-pair telephone line is the DSL line sharing the cable bundle with the ISDN lines.

A burst-clock detector generates a remote burst clock. A remote DSL processor is coupled to the remote telephone-line interface and receives the remote burst clock from the burst-clock detector. The remote burst clock controls the remote DSL processor to transmit during the upstream time-window and receive during the downstream time-window. The remote DSL processor receives a remote data stream from a customer data equipment and generates the upstream passband signal that represents the remote data stream.

The remote DSL processor transmits the upstream passband signal to the central-office-side device over the DSL line. The remote DSL processor receives the downstream passband signal from the central-office-side device and extracts from the downstream passband signal a represented data signal for transmission to the customer data equipment.

In still further aspects the DSL processor and the remote DSL processor each have a symbol encoder that combines a sequence of binary bits from the data stream into a symbol that represents multiple binary bits for transmission as a passband signal over the copper-pair telephone line. A carrier-less amplitude/phase modulator (CAP) filter generates the transmitted waveform within a desired frequency range. The sequence of binary bits are encoded by both an amplitude and a phase of the upstream passband signal and the downstream passband signal. Thus data is encoded by both the amplitude and the phase of passband signals for transmission by the DSL line card.

In still further aspects a trellis encoder is coupled to the symbol encoder. It performs trellis-code modulation of data for transmission. A viterbi decoder is coupled to receive data from the copper-pair telephone line. It decodes symbols encoded by a trellis encoder at the remote customer site.

In other aspects the central-office-side device has a frequency splitter coupled to the copper-pair telephone line. It separates a low-frequency voice signal from the upstream passband signal that are both simultaneously received from the remote customer site over the copper-pair telephone line. A voice encoder receives the low-frequency voice signal from the frequency splitter. It codes the voice signal for transmission to another central office over a voice telephone network. The voice signal and the upstream passband signal are carried over the copper-pair telephone line. The upstream passband signal does not overlap a frequency range of the voice signal.

BRIEF DESCRIPTION OF THE DRAWINGS

FIG. 2 is a timing diagram for a TCM-ISDN line.

FIG. 3 is a diagram of interference at a central office from several ISDN lines transmitting in synchronization.

FIG. 4 is a transmitting-signal spectrum of a TCM ISDN modem.

FIG. 5 is a diagram of the partitioning of frequency bands for ADSL (T1.413) service using frequency-division duplex and voice calls.

DETAILED DESCRIPTION

The present invention relates to an improvement for high speed modems in telephone systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Time-Compression-Multiplexed (TCM) DSL

The inventors have realized that, although unusual, a time-compression-multiplexing (TCM) scheme can be used with xDSL. TCM is not used with existing xDSL systems, perhaps because the required bandwidth is more than doubled compared with full-duplex. TCM requires that the data be compressed into a transmit period of slightly less than half the overall cycle time. Full duplex with echo cancellation, or frequency division multiplexing has been the exclusive method for xDSL systems and ISDN in the United States and many other countries.

No NEXT Interference During TCM-ISDN Receive Periods

Although wider bandwidth is necessary for TCM, interference with other lines can be reduced. Simply using TCM for xDSL lines is not necessarily a benefit in itself. However, the inventors realize that when TCM is used for xDSL, which has to be installed on cables with high cross-talk and to coexist with the TCM ISDN, the xDSL line's transmit and receive periods (time-windows) can be synchronized with the older TCM ISDN transmit and receive windows.

Since the TCM ISDN modems stop transmitting during their receive windows, there is no NEXT interference from the older TCM ISDN lines during the receive windows. Furthermore, when all these new xDSL modems are synchronized, there is no self NEXT interference (NEXT from the same xDSL on other pairs in the cable bundle). Thus the newer xDSL equipment can receive without TCM ISDN NEXT interference and self NEXT during these receive windows. The problem of severe NEXT interference is eliminated.

TCM-DSL Synchronized to TCM-ISDN

In countries where pulp cables are used, due to the high cross-talk, TCM ISDN is a good alternative over echo cancellation ISDN. A typical example is in Japan. Other countries that also use pulp-insulated cables or time-compression-multiplexed ISDN may also benefit from TCM-DSL.

Figure 1:
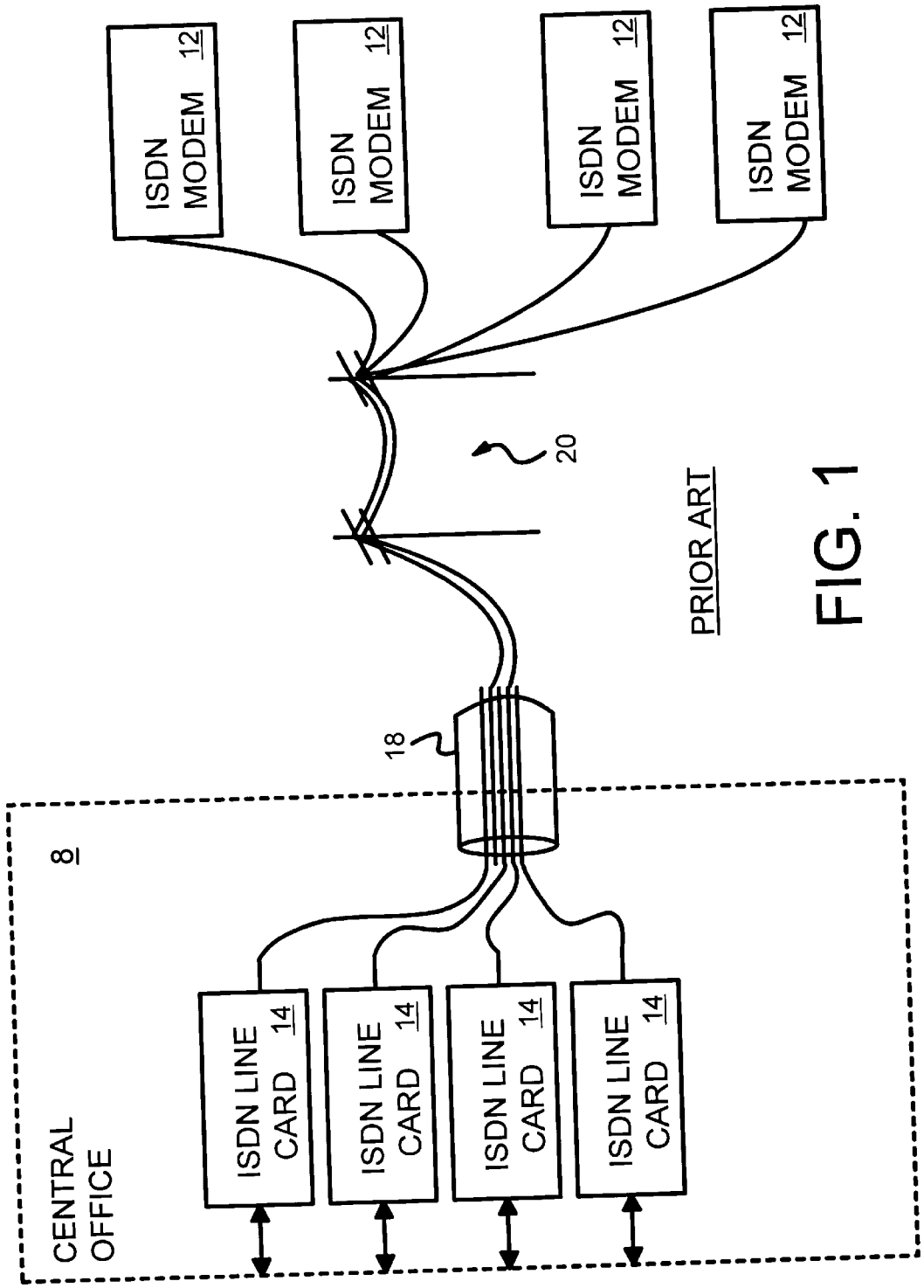
FIG. 1 shows the problem of interference from existing ISDN lines.
Figure 6:
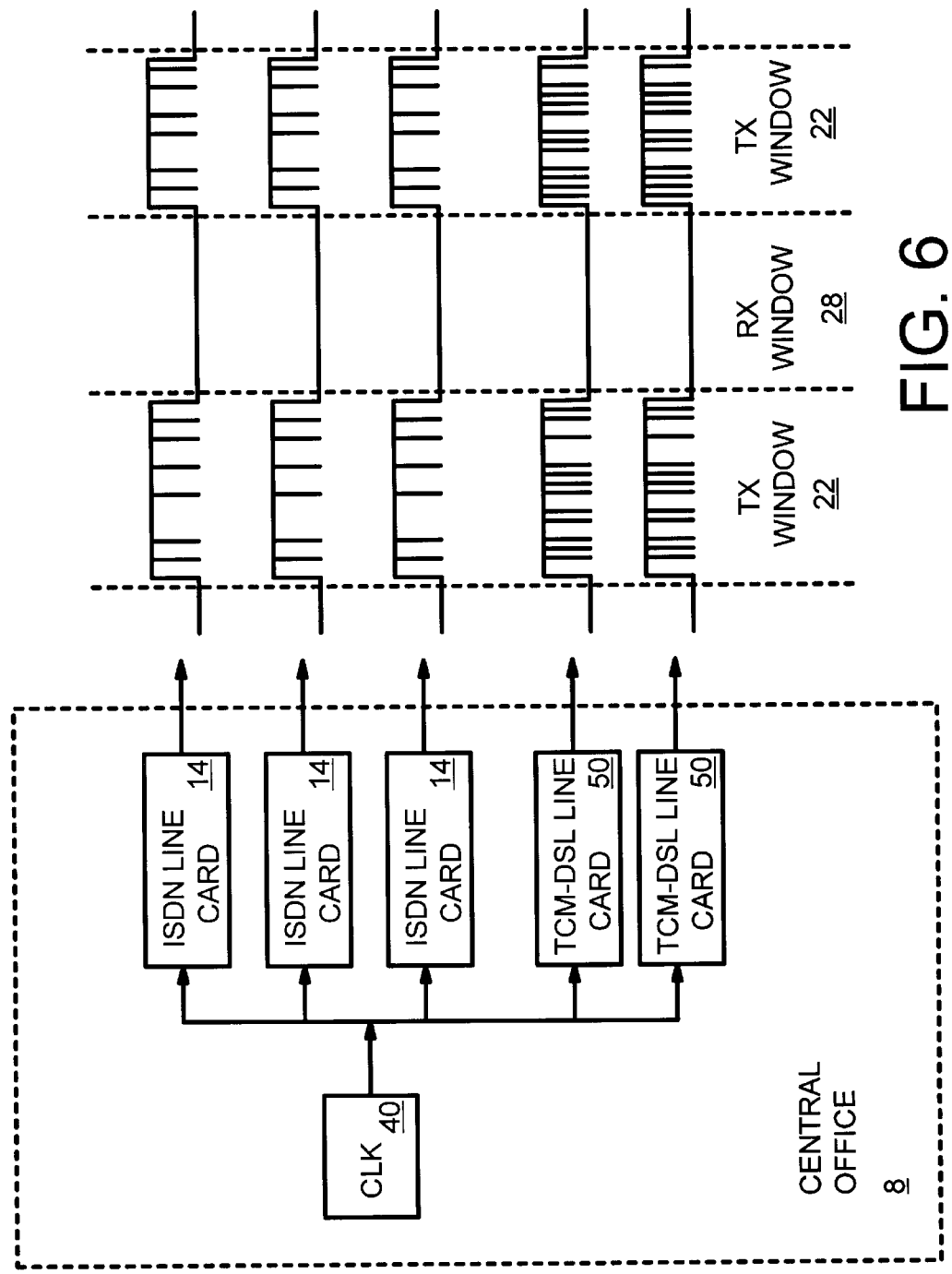
FIG. 6 is a diagram of a TCM-DSL line card synchronized to TCM-ISDN line cards in a central office.

FIG. 6 is a diagram of a TCM-DSL line card synchronized to TCM-ISDN line cards in a central office. Central office 8 contains several ISDN line cards 14 that use time-compression multiplexing to transmit and receive during separate time windows. ISDN line cards 14 are synchronized by clock 40 to all transmit at the same time and all receive at the same time. Thus all ISDN line cards transmit during one phase of clock 40 but stop transmitting and receive during the other phase of clock 40.

Clock 40 is also routed to TCM-DSL line card 50. Clock 40 synchronizes TCM-DSL line card 50 so that it also transmits during transmit window 22 but receives during receive window 28. Since ISDN line cards cease transmitting during receive window 28, there is no NEXT interference from ISDN line cards 14 and other TCM-DSL line cards 50 during receive window 28.

NEXT Interference from ISDN line cards 14 and other TCM-DSL line cards 50 during transmit window 22 is significant. However, TCM-DSL line card 50 is also transmitting during transmit window 22, and not receiving. Therefore the strong NEXT interference is ignored by the receiver. Although far-end cross-talk (FEXT) still exist when TCM-DSL is receiving, it is attenuated by the length of the telephone line. Thus FEXT is not as severe as the near-end cross-talk (NEXT). The invention eliminates the mechanism for NEXT, leaving FEXT and loop attenuation as the performance-limiting factors.

TCM-DSL line card 50 uses more advanced modulation techniques to encode more than one bit per symbol. Thus TCM-DSL line card achieves a higher data rate than ISDN line cards 14. More data is transmitted by TCM-DSL line card 50 than by ISDN line cards 14 during each transmit window 22.

Figure 7:
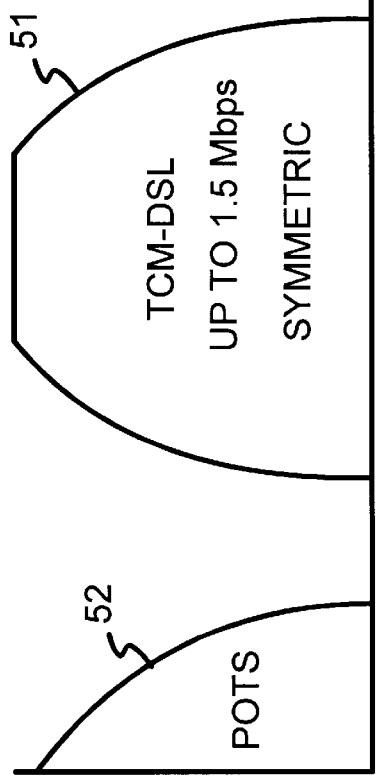
FIG. 7 is a frequency spectrum for TCM-DSL.

Pass-band for TCM-DSL—FIG. 7

FIG. 7 is a frequency spectrum for TCM-DSL. TCM ISDN uses an AMI line code that occupies a wide frequency range. Even the low frequencies down to D.C. are occupied by ISDN, preventing standard voice calls from simultaneously using the telephone lines. In contrast, TCM-DSL uses a pass-band coding technique that does not transmit energy in voice band. This allows voice calls or voice-band modems to simultaneously use the telephone line.

Standard telephone equipment is used to carry voice calls over the low-frequency plain-old-telephone-system (POTS) band 52. POTS band 52 occupies frequencies from 0 to 4 kHz, which is much of the range for human voice and hearing. At the same time, TCM-DSL data is carried over a higher-frequency pass-band 51. Pass-band 51 occupies frequencies of about 30 kHz to as much as 500 kHz, although the band can be varied somewhat.

Figure 8:
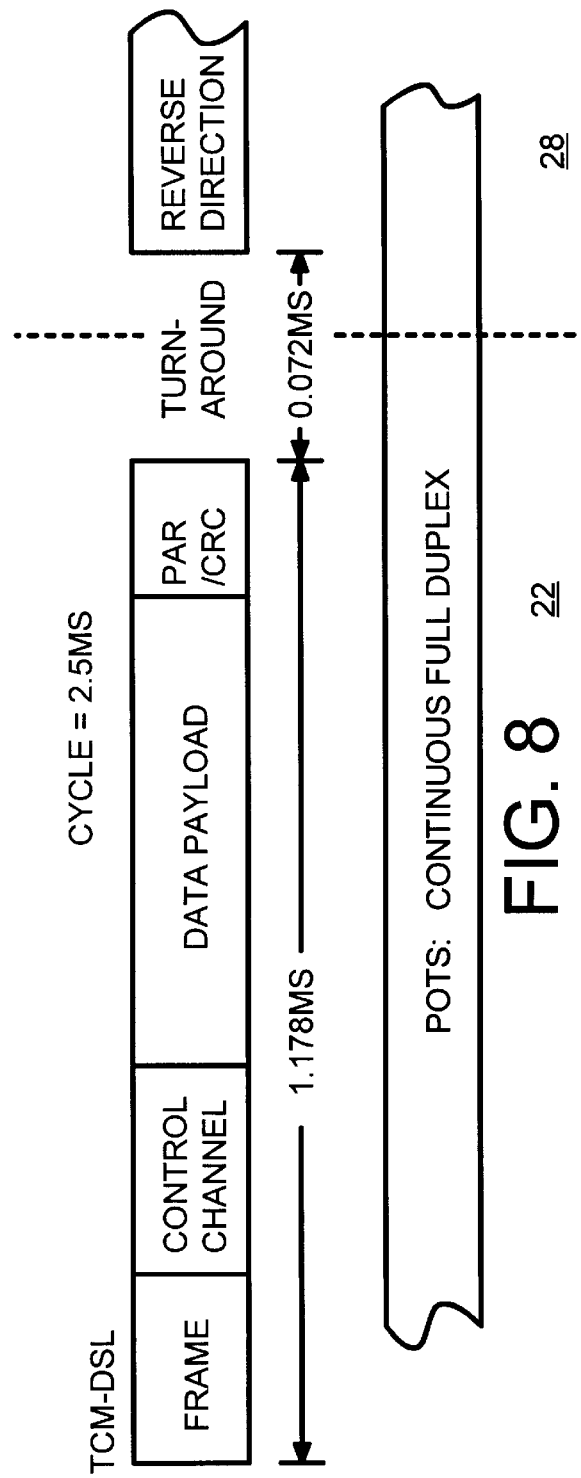
FIG. 8 is a diagram of framed TCM-DSL data for Time-Compression Multiplexing (TCM).

TCM-DSL Framing With Continuous POTS—FIG. 8

FIG. 8 is a diagram of framed TCM-DSL data for Time-Compression Multiplexing (TCM). TCM-DSL's transmitting and receiving windows are synchronized with the windows for TCM ISDN. Therefore, the framing structure of TCM-DSL is similar to that of TCM ISDN. The central-office side TCM-DSL transmits signals for 1.178 milliseconds during window 22.

After the customer-premises equipment (CPE) modem receives the end of the transmit window 22, there is a short turn-around period before the CPE modem starts to transmit. This turn-around period is about 0.02 ms for TCM-ISDN systems, which is matched by the TCM-DSL line cards. Then the remote modem at the customer premises transmits during receive window 28. Since the ISDN line cards are also receiving at that time, there is no NEXT cross-talk at the central office. The process repeats with a period of 2.5 ms.

While the TCM-DSL data is synchronized with the ISDN timing, voice analog signals are continuously transmitted and received at both ends of the telephone line. The POTS band operates continuously in full duplex. Voice can be both transmitted and received during both transmit window 22 and receive window 28 simultaneously with the TCM-DSL signal, since separate frequency bands are used for POTS and TCM-DSL.

TCM-DSL Equipment Includes Frequency Splitter

Figure 9:
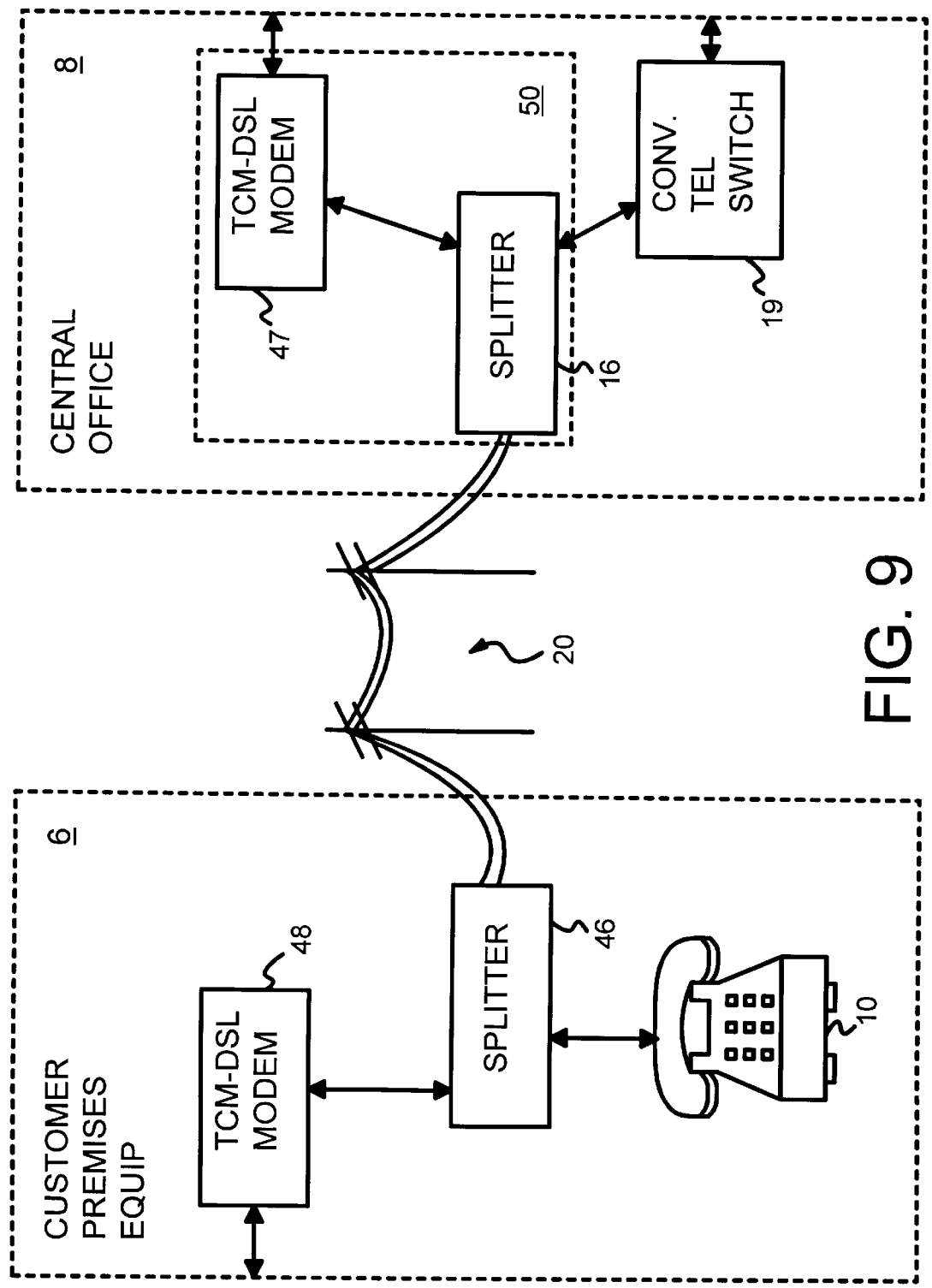
FIG. 9 is a diagram of a TCM-DSL phone line highlighting the frequency splitters.

Special equipment is needed at both the customer premises and at the phone company's central office where the customer's copper phone line ends. FIG. 9 is a diagram of a TCM-DSL phone line highlighting the frequency splitters.

Copper phone line 20 is a pair of copper wires running from central office 8 to the customer. The phone customer has installed customer premises equipment 6. Since TCM-DSL uses high frequencies for data traffic and POTS uses low frequencies for voice calls, the signal received over POTS phone line 20 must be split into high- and low frequency components. Splitter 46 contains a low-pass filter that outputs the low-frequency components from copper phone line 20. These low-frequency components carry the voice calls that are sent to telephone set 10. Telephone set 10 is a standard POTS analog telephone set. Additional phone sets, fax machines, or voice-band modem equipment can be connected to telephone set 10 as phone-line extensions as is well-known.

Splitter 46 also contains a high-pass filter that outputs the high-frequency components to TCM-DSL modem 48. TCM-DSL modem 48 receives the high-frequency analog signal from splitter 46 and converts it to downstream digital data during the receiving window. During the transmitting window, it converts the upstream data into high-frequency analog signal. Splitter 46 mixes this high-frequency analog signal from TCM-DSL modem 48 with the low-frequency voice from telephone set 10 and transmits the combined signal over copper phone line 20 to central office 8.

Central office 8 receives copper phone line 20 and splits off the high-frequency components with splitter 16. The high-frequency components from splitter 16 are sent to TCM-DSL modem 47, which converts the analog high-frequency signal to an upstream digital data. TCM-DSL line card 50 shown in FIG. 6 includes TCM-DSL modem 47 and, in some embodiments, splitter 16. The data stream can then be connected to a high-speed data highway or backbone.

Splitter 16 sends low-frequency components to conventional telephone switch 19, which includes a line card similar to conventional line cards that terminate POTS lines. Conventional telephone switch 19 connects this voice call to remote voice-band equipment such as a telephone set.

Incoming voice calls received by conventional telephone switch 19 are combined by splitter 16 with high-frequency data traffic from TCM-DSL modem 47. The combined signal is transmitted over copper phone line 20 to customer premises equipment 6.

Figure 10:
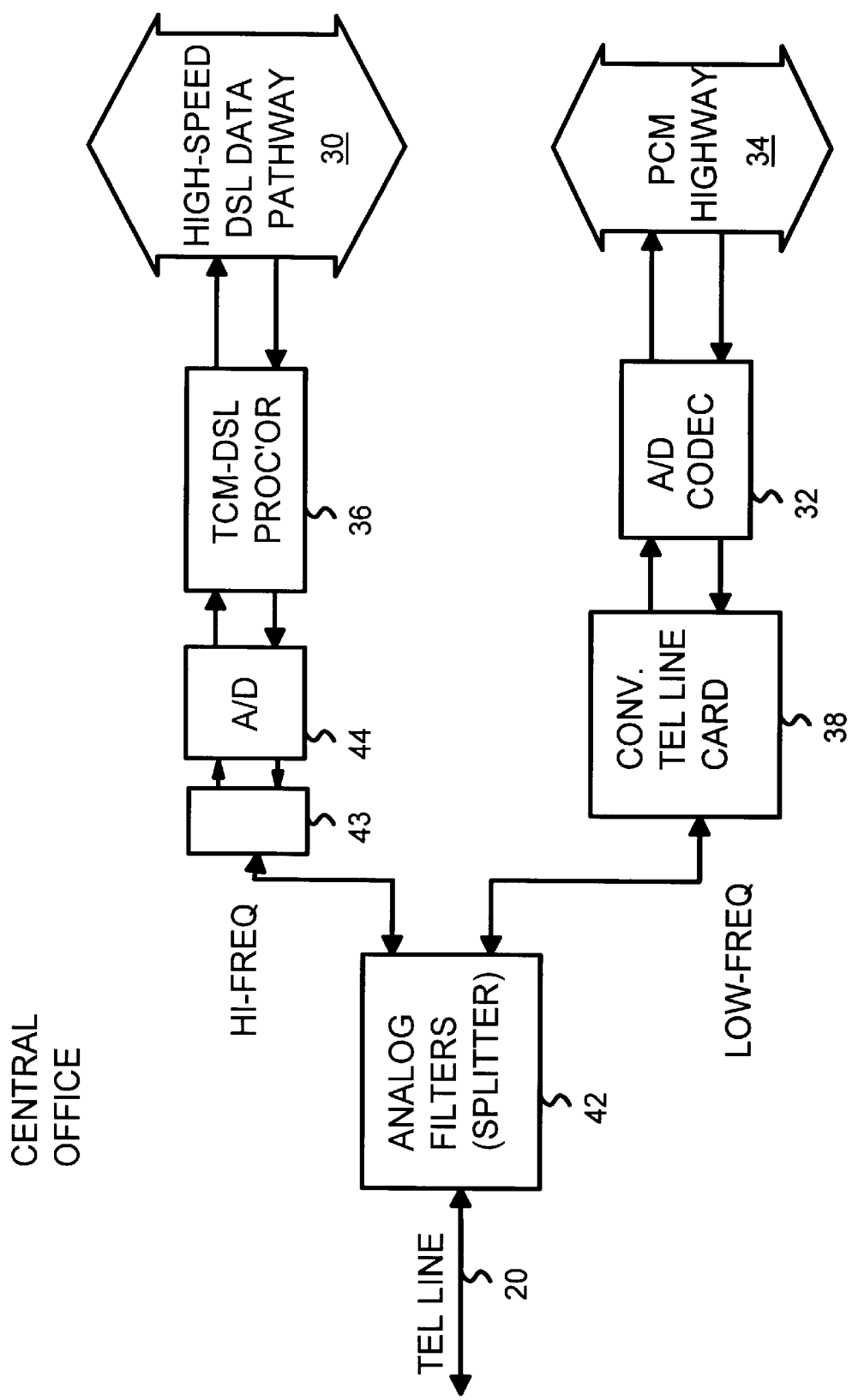
FIG. 10 is a diagram of TCM-DSL line equipment at a central office.

TCM-DSL at Central Office—FIG. 10

FIG. 10 is a diagram of TCM-DSL line equipment at a central office. Copper phone line 20 is received at the central office by POTS splitter 42. POTS splitter 42 uses transformers or inductor coils together with resistors and capacitors to form high-pass and low-pass filters. The output of the high-pass filter in POTS splitter 42 is the high-frequency TCM-DSL signal, which is sent to analog-digital A/D converter 44. A/D converter 44 converts the analog signal from POTS splitter 42 to digital values at a high sampling rate. These digital values are sent to TCM-DSL processor 36, which extracts the encoded data values transmitted from the TCM-DSL modem at the customer premises.

The data from TCM-DSL processor 36 is combined with other data for transmission over a shared high speed data pathway 30. High-speed data pathway 30 can be a fiber-optic backbone or other high-bandwidth network. TCM-DSL processor 36 also receives data from high-speed data pathway 30 and encodes the data. The encoded data is then converted to analog signals by A/D converter 44, and the resulting analog waveform is sent to POTS splitter 42 where it is combined with the low-frequency voice signal and transmitted to the customer's premises over phone line 20.

The low-frequency components output from the low-pass filter in POTS splitter 42 are sent to conventional telephone line card 38, which is a standard line card used to terminate POTS phone lines. The receiving and transmitting signals are separated by a hybrid circuit 43 on the telephone line card. The analog signals from conventional telephone line card 38 are converted to digital values and encoded as PCM signals by CODEC 32. The PCM signals from CODEC 32 are combined with signals from other line cards (not shown) and transmitted over PCM highway to other central offices, or to a long-distance network.

Incoming voice calls from PCM highway 34 are decoded and converted to analog-waveforms by CODEC 32. The analog waveforms are driven by conventional telephone line card 38 and then mixed with the high-speed TCM-DSL data by POTS splitter 42 and transmitted out on copper phone line 20.

Figure 11:
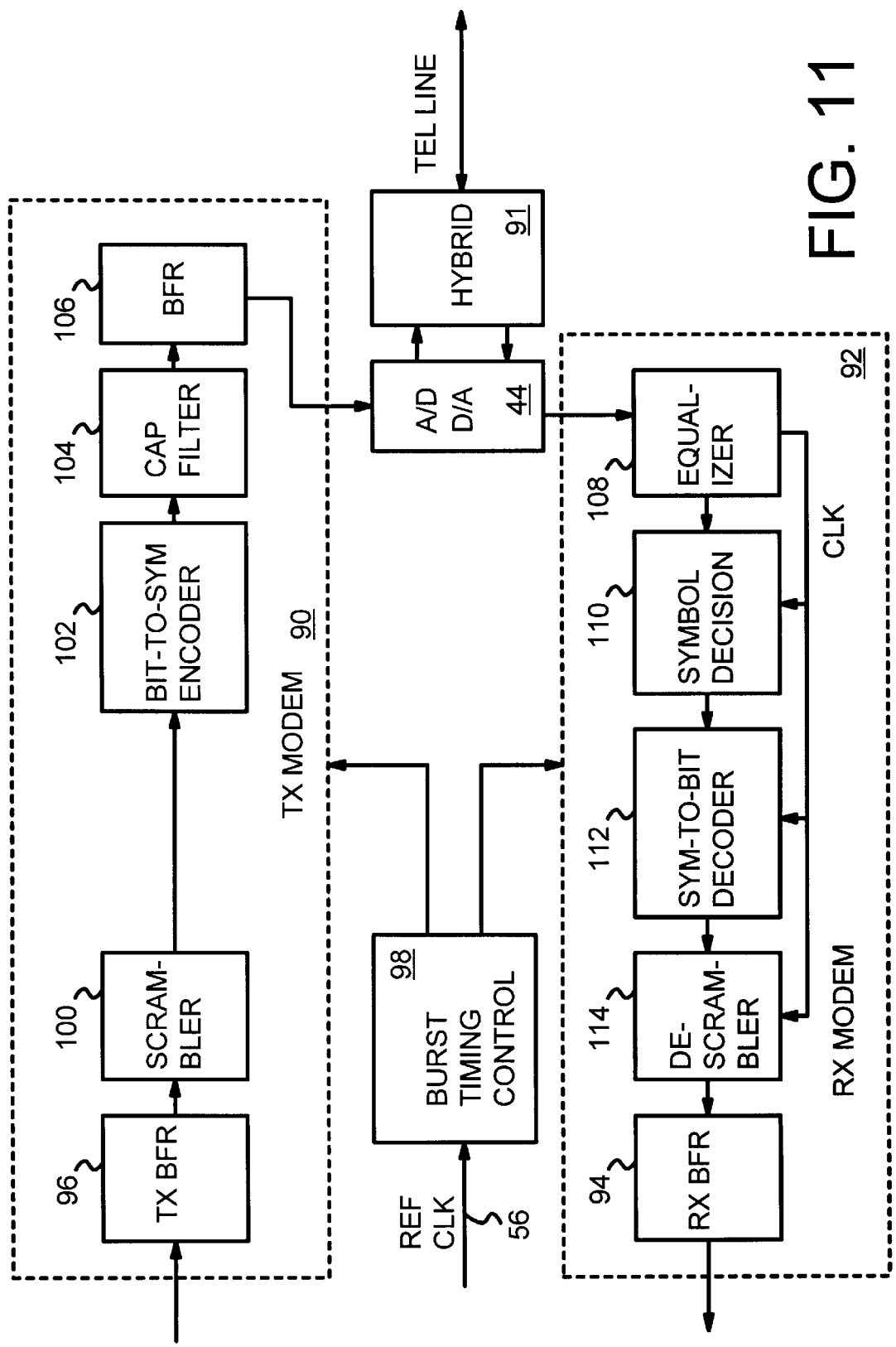
FIG. 11 is a diagram of a TCM-DSL modem.

TCM-DSL Modem—FIG. 11

FIG. 11 is a diagram of a TCM-DSL modem. This modem can be used either at the customer premises or at the central office; a central office implementation is shown in the example. Hybrid circuit 91 performs 2-to-4-wire conversion, which converts the bi-directional 2-wire transmission into 2 pairs of one-directional transmissions. One pair is for receiving and one is for transmitting. Analog front-end 44 includes an A/D converter and a D/A converter. The separated, filtered signal converted by analog front-end 44 from analog to digital is sent to modem receiver 92, while the output from modem transmitter 90 is converted from digital to analog by the D/A converter in analog front-end 44 and sent to hybrid circuit 91.

Modem receiver 92 includes digital equalizer 108 for correcting the distortions caused by the line's frequency response. There may be different modes to control the modem clock. In one mode, the central-office-side modem synchronizes its clock to the network clock. In another mode, each modem's receiver synchronizes its clock to the remote modem's transmitter clock. In that mode, clock recovery with equalizer 108 recreates the timing of the remote transmitter. A two-stage approach may be used for clock recovery: the clock adapts quickly when the start-frame sequence begins, while a slowly-adapting clock is used for the remainder of the data burst.

Symbol decision block 110 detects the symbols from the data stream. The actual structure of symbol decision block 110 may vary, depending on the encoding scheme used by the remote transmitter. For the un-coded system, symbol decision block 10 may be just a slicer. For a Trellis-code modulation system, a Viterbi decoder is often used for block 110 to improve the reliability of the decision. Since each symbol can encode a series of bits, symbol-to-bit decoder 112 converts the symbols to binary bits. Descrambler 114 restores the bits to their original value before they were scrambled by the transmit scrambler. The de-scrambled bit stream is buffered by receive buffer 94 before being sent to the high-speed data pathway at the central office, or to the customer's data terminal equipment.

Data ready for transmission is received from the customer's data terminal equipment or the telephone network's data pathways and buffered by transmit buffer 96. Transmit buffer 96 and receive buffer 94 are especially necessary when the data is continuous, while the TCM-DSL modem bursts data using time compression.

Scrambler 100 in transmit modem 90 operates on the input-data bits, in order to randomize the data pattern. Symbol encoder 102 receives sequences of bits from buffer 96 and encodes them as symbols in the signal constellation. If carrierless amplitude/phase modulation (CAP) is used, a two-dimensional constellation is used where each signal point in the constellation has an in-phase component and a quadrature component. Such a two dimensional signal constellation is the same as the one used by the well-known QAM (quadrature amplitude modulation), where both the pulse amplitude and the phase carry data information. Depending on the constellation size, each symbol carries multiple bits. For example, 64-CAP has 64 points in the constellation, meaning that each symbol may carry 6 binary bits. An even bigger constellation may be used to carry more bits per symbol.

As an example, Using 64-CAP and a 500 kbaud symbol rate, a transmission rate of 6×500k=3 megabit/second is achieved. Due to TCM, each direction sends data in slightly less than half the time; hence the averaged data rate in this case is slightly below 1.5 megabit/second, which is much higher than ISDN. Higher effective data rates than ISDN are achieved by the more advanced techniques (such as CAP) used by TCM-DSL.

CAP filter 104 shapes the transmitted pulses and places the transmitted signal into the desired frequency band. The output of CAP filter 104 typically has a higher sampling rate. Buffer 106 stores the filtered samples for transmission. D/A converter 45 converts the samples to analog signals which go through hybrid 91 and drive the telephone line through the POTS splitter.

Burst Timing

At the central office, burst timing control 98 receives clock 56 from the central office TCM ISDN burst-timing control circuit, or from extracting burst timing from an ISDN line signal. At the customer side, clock 56 is derived from the transmit burst received from the central office. Burst clock 56 identifies when the transmit and receive windows occur for the ISDN cards at the central office. In one embodiment the burst clock is a near-50%-duty cycle clock having a period equal to the total of the transmit and receive windows and the tarn-around time (a total of 2.5 milliseconds). When burst clock 56 is low, the transmit window is indicated, while the high phase of burst clock 56 indicates the receive window. The falling edge of burst clock 56 signals modem transmitter 90 to transmit a frame of data for 1.178 milliseconds, while the rising edge of burst clock 56 signals modem receiver 92 to receive a frame of data. Since the data frames are of fixed length, bit or symbol counters can be used to end transmission or reception of the bursts of data.

Figure 12:
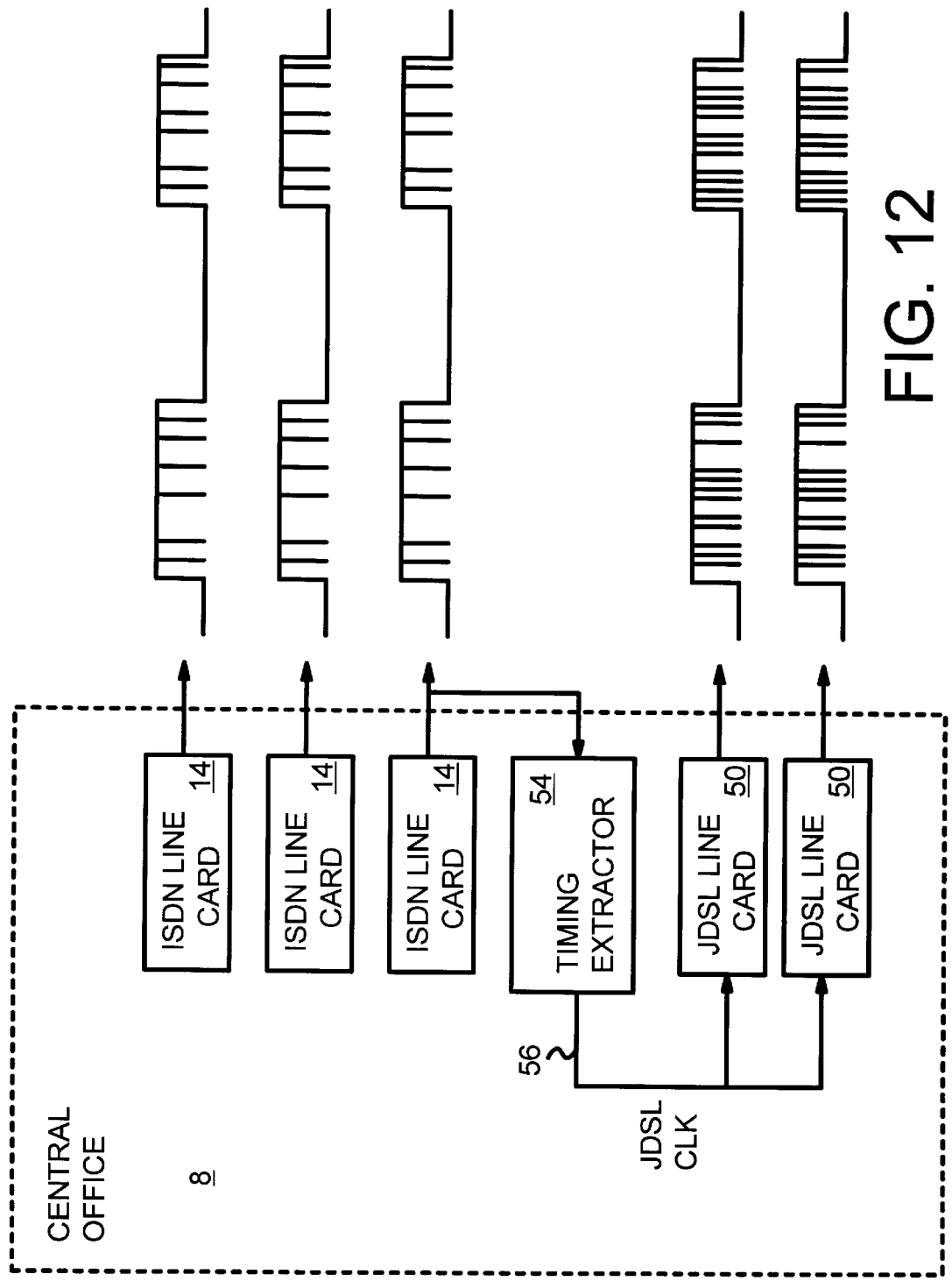
FIG. 12 is a diagram of a TCM-DSL line card that extracts the TCM timing of ISDN lines.

Extracting ISDN Timing—FIG. 12

FIG. 12 is a diagram of a TCM-DSL line card that extracts the TCM timing of ISDN lines. Often, TCM-DSL line cards can get the TCM timing clock directly from TCM ISDN burst timing circuit. In cases where a clock source for ISDN TCM timing is not directly available, TCM timing can be extracted from the ISDN line signal or the NEXT from one or more of the TCM ISDN line signals by timing extractor 54.

The timing extractor in FIG. 12, is functionally a modified TCM ISDN Customer Premises Modem. The input to timing extractor 54 is connected to an ISDN line card's output. Timing extractor 54 detects the beginning of the burst of data transmitted by detecting the start-frame sequences of the ISDN signal This is useful when the ISDN line cards are mounted on a separate rack or even in a separate room or building from the TCM-DSL line cards. If TCM ISDN is not installed in the same cable bundle, a TCM burst control circuit can be installed to generate the burst-timing clock for TCM-DSL modems.

Timing extractor 54 generates burst clock 56 that is sent to TCM-DSL line card 50, and to other TCM-DSL line cards 50 at central office 8. The input to timing extractor 54 may be connected to the TCM-DSL line signal rather than the ISDN line signal. The timing extractor then senses when interference from ISDN lines in the same cable bundle is occurring and adjusts its TCM timing accordingly. The transmit timing of the ISDN modems can be detected by measuring the level of interference on the TCM-DSL line. The interference during the Central Office transmit time will be higher since this interference is caused by NEXT which is typically much higher than FEXT. In order to make this measurement, the Central Office modem and the CPE modem should not be transmitting. Once the correct transmit time has been found, normal operation can begin.

In order to maintain the correct transmit time, silent periods can be inserted periodically to check the interference measurement. If the 8 KHz network clock is available, it can be used by timing extractor 54. The ISDN transmit burst timing always maintains the same timing relationship to the 8 KHz network clock. For example, the 8 KHz network clock can be divided by 20 to get the burst timing clock of a frequency 400 Hz. Timing extractor 54 can generate the 400 Hz clock the same way. The frequency of these two 400 Hz clocks will be the same. Timing extractor 54 only has to lock the relative phase of these two 400 Hz clocks. This is achieved by comparing the phase of the TCM-DSL burst clock with the phase of the detected burst clock from the ISDN line signal or from the interference from the ISDN lines.

Sensing ISDN Timing by Interference

As an alternative to the above method the TCM ADSL line cards in the central office sense the TCM ISDN timing by measuring the crosstalk induced on their lines. This can be accomplished by introducing a silent period in the modem training. During this silent period the amount of crosstalk is measured. If TCM ISDN lines are in the same bundle, the central office's TCM-ISDN transmit time is marked by an increased level in the measured crosstalk.

In order to maintain the correct transmit time during normal operation, silent periods can be inserted periodically to check the interference measurement. In such a scheme as part of training all central office modems may make the crosstalk measurement together. One modem may then be chosen to act as the timing master for all the others. This method has the benefit of redundancy. If no modems detect crosstalk, it can be assumed that TCM ISDN interference is not a problem and one modem can be chosen to be the timing master in a free running mode.

Figure 13:
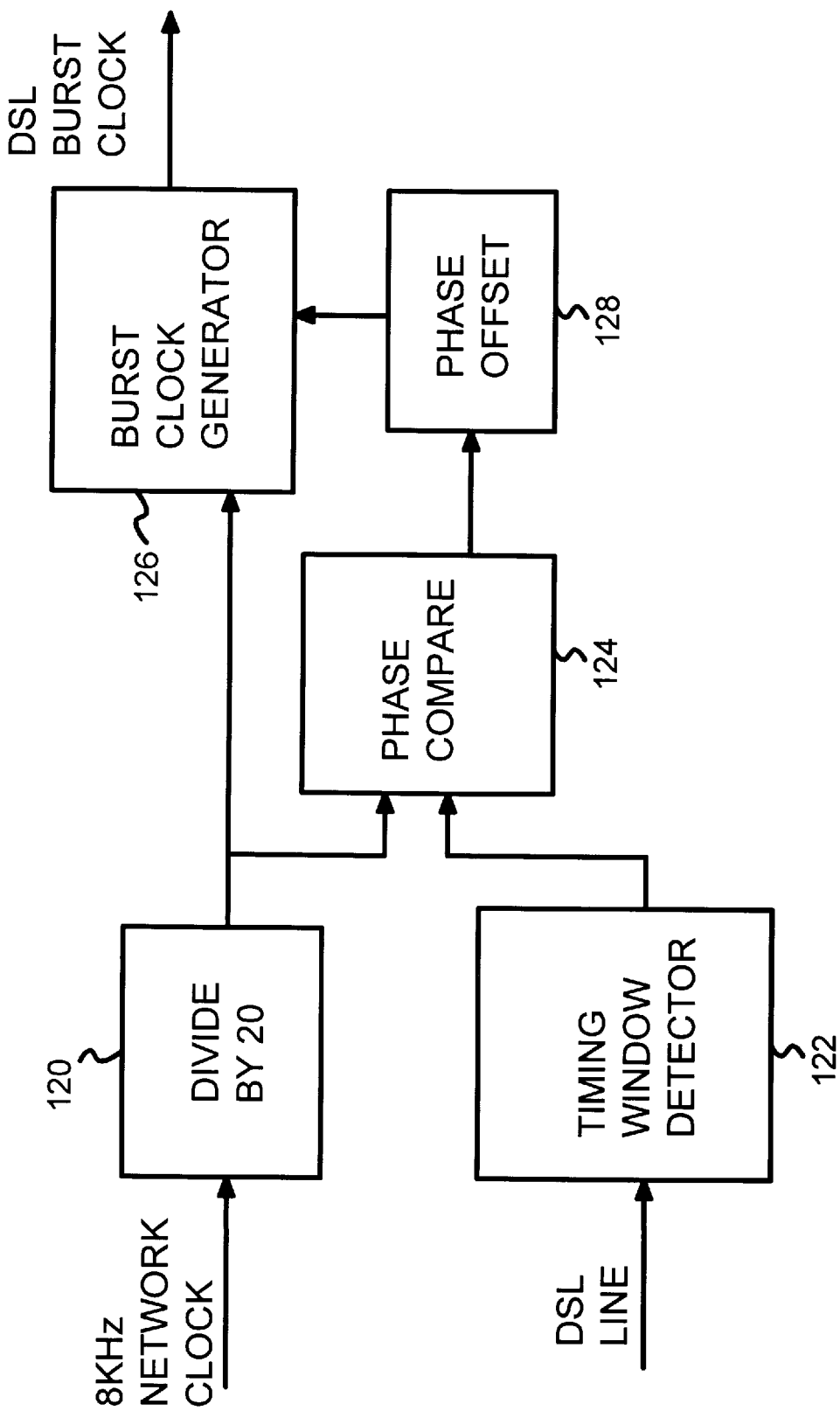
FIG. 13 shows an alternative embodiment for sensing crosstalk interference during normal operation and using an 8 KHz network clock.

Sensing and Storing ISDN Timing—FIG. 13

FIG. 13 shows an alternative embodiment for sensing crosstalk interference during normal operation and using an 8 KHz network clock. An 8 KHz network clock is divided by divider 120 to produce a 400 Hz clock (2.5 ms period). This 400 Hz clock is exactly the same frequency as the TCM ISDN burst clock, but has an arbitrary phase difference. Timing extractor 122 measures the level of interference on the copper line as part of the training sequence. From the level of this interference the downstream transmit window of the TCM ISDN modems can be determined. This will be the 1.178 ms window showing the highest level of interference. The phase difference between the 400 Hz clock and the measured downstream TCM ISDN timing window is measured by phase comparator 124, and recorded as phase offset 128. This recorded phase offset 128 is then used during modem operation by burst clock generator 126 to generate the DSL downstream timing window. This ensures that the DSL downstream window and the TCM ISDN downstream window remain in phase.

Figure 14:
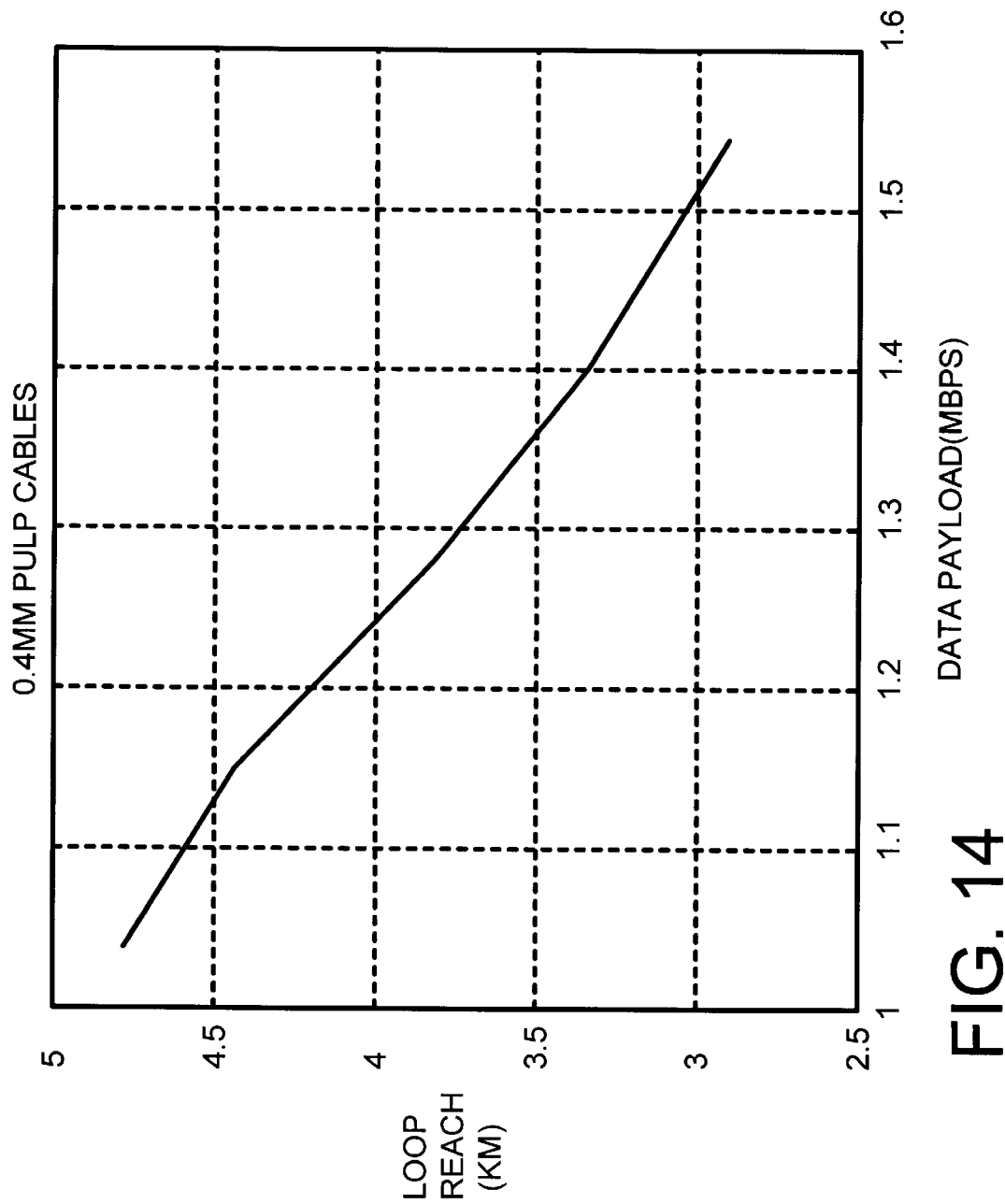
FIG. 14 is a graph of exemplary data rates achievable for TCM-DSL synchronized to TCM-ISDN for various telephone-line lengths.

High Data Rates with Pulp Cables—FIG. 14

FIG. 14 is a graph of exemplary data rates achievable for TCM-DSL synchronized to TCM-ISDN for various telephone-line lengths. The effect of cross-talk from ISDN and other TCM-DSL lines is significantly reduced, allowing higher data rates to be achieved with poorly-insulated 0.4-mm pulp cables. For example, simulations show that a 3 km-long pulp telephone line can achieve a 1.5 Mbps data rate using TCM-DSL. This is an astonishingly high rate for such a poor cable. Data rates over 1 Mbps are still achievable for lines as long as 4.5 km. This loop length reaches over 99% of the customers in Japan.

ADVANTAGES OF THE INVENTION

Synchronizing TCM-DSL timing to TCM-ISDN eliminates the effect of NEXT crosstalk to and from ISDN and other TCM-DSL services in the same cable bundle, even when high-cross-talk pulp cables are used and the ISDN transmitted signal is poorly filtered. Thus higher-performance DSL equipment can co-exist with noisy existing lines and transmit data at about ten times the rate of older ISDN equipment by using CAP modulation and other advanced signal processing techniques, such as Trellis code modulation and pre-coding.

The TCM-DSL system can therefore be added to an existing phone system in countries such as Japan where TCM ISDN is used. High-bandwidth TCM-DSL is achieved even with inferior pulp cables. Existing TCM-ISDN lines can co-exist with TCM-DSL lines in a common cable bundle. Interference from existing ISDN lines is reduced for lines in a cable converted to higher-bandwidth TCM-DSL lines. Japan and other countries with pulp cables or time-compression-multiplexed ISDN lines can benefit from the invention.

ALTERNATE EMBODIMENTS

Several other embodiments are contemplated by the inventors. Many circuit implementations are possible. While the invention has been described as mimicking the ISDN timing, the TCM-DSL timing can be adjusted somewhat, such as to expand the downstream window relative to upstream window, when there is no TCM ISDN in the same cable bundle. This would provide asymmetric data rates by increasing the download bandwidth at the expense of the upload bandwidth.

The frequency range of the TCM-DSL pass-band can be varied. The frequency bandwidth can be reduced for lower data rates and/or for shorter telephone lines. While the term "line card" has been used, it is apparent that the functions described for the line card could reside on a printed-circuit-board substrate, a metal or ceramic substrate, or on other modular systems such as racks or boxes. The functions of the line card can be arranged on multiple substrates or integrated onto one or more silicon semiconductor chips.

Processing of the TCM-DSL and POTS data streams can occur in parallel, either by using two separate processors in the DSP, or with time-sharing of a fast DSP. A large analog driver with enough drive for the phone line is also normally added to the analog output of the D/A converter. Various signal processing techniques, such as Trellis encoding/Viterbi decoding and pre-coding/pre-emphasis can be used in the encoder/decoder, or not used in cost-sensitive applications. Instead of CAP modulation, QAM modulation or other pass-band modulation techniques can be used.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A Digital-Subscriber-Line (DSL) system for high-speed data transmission using passband modulation over a copper-pair telephone line, for reducing an effect of crosstalk interference with Integrated Services Digital Network (ISDN) on closely-located copper pairs, wherein ISDN devices are Time Compression Multiplexing (TCM) systems that transmit data from a central office side but not from remote sites during a downstream time-window, and wherein the ISDN devices receive but not transmit at the central office side during an upstream time-window, the DSL system comprising a central-office-side device comprising:

a data network interface for connecting to a data network;

a burst-clock input for receiving a burst clock indicating the downstream time-window when the ISDN devices at the central office side are transmitting from the central office side to the remote sites, and for indicating the upstream time-window when the ISDN devices at the central office side are receiving remotely-transmitted data from the remote sites;

a telephone-line interface for connecting to a copper-pair telephone line connected to customer-premises DSL equipment at a remote customer site, the copper-pair telephone line being a DSL line sharing a cable bundle with TCM-ISDN lines driven by the ISDN devices; and a DSL processor, coupled to the telephone-line interface, to the data-network interface, and to the burst clock input, for receiving the burst clock synchronized to the TCM-ISDN lines, the burst clock for controlling the DSL processor to transmit during the downstream time-window and receive during the upstream time-window, the DSL processor for receiving a data stream from the data network and for generating a downstream passband signal to represent the data stream, the DSL processor for transmitting the downstream passband signal to the customer-premises DSL equipment at the remote customer site over the DSL line, the DSL processor for receiving an upstream passband signal from the customer-premises DSL equipment and for extracting from the upstream passband signal a represented data signal for transmission to the data network, wherein the DSL system provides a higher data rate than the ISDN devices but the DSL system is synchronized to the IDSN devices to reduce the effect of the crosstalk interference.

2. The DSL system of claim 1 wherein the customer-premises DSL equipment at the remote customer site comprises:

a remote telephone-line interface for connecting to the copper-pair telephone line that is connected to the central-office-side device, the copper-pair telephone line being the DSL line sharing the cable bundle with the ISDN lines;

a burst-clock detector for generating a remote burst clock; and a remote DSL processor, coupled to the remote telephone-line interface and receiving the remote burst clock from the burst-clock detector, the remote burst clock for controlling the remote DSL processor to transmit during the upstream time-window and receive during the downstream time-window, the remote DSL processor for receiving a remote data stream from a customer data equipment and for generating the upstream passband signal that represents the remote data stream, the remote DSL processor for transmitting the upstream passband signal to the central-office-side device over the DSL line, the remote DSL processor for receiving the downstream passband signal from the central-office-side device and for extracting from the downstream passband signal a represented data signal for transmission to the customer data equipment.

3. The DSL system of claim 2 wherein the DSL processor and the remote DSL processor each further comprise:

symbol encoding means for combining a sequence of binary bits from the data stream into a symbol representing multiple binary bits for transmission as a passband signal over the copper-pair telephone line; and a carrierless amplitude/phase modulator (CAP) filter for generating a transmitted signal representing the sequence of binary bits within a frequency passband, wherein the sequence of binary bits are encoded by both an amplitude and a phase of the upstream passband signal and the downstream passband signal, for transmission by the DSL line card.

4. The DSL system of claim 3 further comprising:

a trellis encoder, coupled to the symbol encoding means, for trellis-code modulation of data for transmission, and a viterbi decoder, coupled to receive data from the copper-pair telephone line, for decoding symbols encoded by a trellis encoder at the remote customer site.

5. The DSL system of claim 1 wherein the central-office-side device further comprises:

a frequency splitter, coupled to the copper-pair telephone line, for separating a low-frequency voiceband signal from the upstream passband signal both simultaneously received from the remote customer site over the copper-pair telephone line, and a voice encoder, receiving the low-frequency voiceband signal from the frequency splitter, for coding the voiceband signal for transmission to another central office over a voice telephone network, wherein the voiceband signal and the upstream passband signal are carried over the copper-pair telephone line, the upstream passband signal not overlapping a frequency range of the voiceband signal.

6. The DSL system of claim 1 wherein the burst clock input receives a burst clock connected to the ISDN devices, whereby the DSL system is directly synchronized to the ISDN devices.

7. The DSL system of claim 1 further comprising:

a burst-clock generator, coupled to the burst-clock input, for generating the burst clock, the burst clock generator comprising:

an ISDN-line input coupled to an ISDN telephone line driven by an ISDN device;

a timing extractor for detecting when data is transmitted from the central office on the ISDN telephone line and for generating the burst clock in synchronization to a data burst on the ISDN telephone line.

8. The DSL system of claim 1 wherein the burst-clock detector comprises:

a TCM-DSL-line input coupled to the DSL line;

an interference detector for detecting crosstalk interference on the DSL line from the ISDN devices when the downstream and upstream passband signals for DSL are disabled; and a burst clock generator, coupled to the interference detector, for generating a burst clock that is synchronized to detected crosstalk interference.

9. The DSL system of claim 8 wherein the burst clock generator further comprises:

a reference clock input, receiving a reference clock, the reference clock having a period equal to a nominal period of an ISDN burst clock; and phase-locking means, coupled to the burst clock generator, for locking a phase of the reference clock to a phase of the detected crosstalk interference to enable the burst clock generator to generate the burst clock synchronized to the detected crosstalk interference.

10. A central office receiving digital-data and voice calls comprising:

plain-old-telephone-system (POTS) line cards for terminating telephone lines carrying low-frequency voice calls;

Integrated Services Digital Network (ISDN) line cards for terminating telephone lines carrying medium-rate digital-data calls, the ISDN line cards transmitting data to remote ISDN terminals at customer premises during a downstream time-window, but the ISDN line cards receiving but not transmitting during a upstream time-window;

Digital-Subscriber-Loop (DSL) line cards for terminating telephone lines carrying high-rate digital-data calls, the DSL line cards transmitting data to remote DSL modems at customer premises during the downstream time-window, but the DSL line cards receiving but not transmitting during the upstream time-window;

wherein the DSL line cards transmit and receive data at a higher rate than the ISDN line cards, wherein an effect of crosstalk interference among the ISDN line cards and the DSL line cards is reduced by the DSL line cards using the downstream and upstream time windows synchronized to the downstream and upstream time windows of the ISDN line cards for the same cable bundle;

a high-speed data pathway for data transmission to other central offices and to international data networks, the high-speed data pathway connected to the ISDN line cards and to the DSL line cards; and a voice network for voice-call transmission to other central offices and to international voice networks, the voice network connected to the POTS line cards and to the DSL line cards;

wherein telephone lines connected to the DSL line cards are bundled together at the central office with telephone lines connected to the ISDN line cards;

wherein cross-talk interference among DSL telephone lines and ISDN telephone lines occurs in a shared cable bundle outgoing from the central office;

wherein the DSL line cards each further comprise a frequency splitter, coupled to the telephone line, for passing low-frequency signal components to the voice network, but for passing high-frequency signal components to the high-speed data pathway;

wherein the low-frequency signal components comprise a low-frequency voiceband having a frequency range down to zero hertz, but the high-frequency signal components comprise a pass band having a lower frequency limit above the low-frequency voiceband;

wherein the higher rate of the DSL line cards is at least two times the medium rate of the ISDN line cards, whereby the DSL line cards are connected to both the high-speed data pathway and to the voice network, the DSL line cards each terminating a telephone line carrying both voice calls and data transmission and whereby signal components from the telephone line are split by frequency into voice calls and high-speed data transmissions and whereby the low-frequency voiceband for voice calls does not overlap the high-frequency band for data transmission of the DSL line cards.

11. The central office of claim 10 wherein the low-frequency voiceband has bounds of 0 and about 4 kHz, while the high-frequency band has a lower bound of 30 kHz and an upper bound of at least 100 kHz.

12. A central office receiving digital-data and voice calls comprising:

plain-old-telephone-system (POTS) line cards for terminating telephone lines carrying low-frequency voice calls;

Integrated Services Digital Network (ISDN) line cards for terminating telephone lines carrying medium-rate digital-data calls, the ISDN line cards transmitting data to remote ISDN terminals at customer premises during a downstream time-window, but the ISDN line cards receiving but not transmitting during a upstream time-window;

Digital-Subscriber-Loop (DSL) line cards for terminating telephone lines carrying high-rate digital-data calls, the DSL line cards transmitting data to remote DSL modems at customer premises during the downstream time-window, but the DSL line cards receiving but not transmitting during the upstream time-window;

wherein the DSL line cards transmit and receive data at a higher rate than the ISDN line cards;

wherein an effect of crosstalk interference among the ISDN line cards and the DSL line cards is reduced by the DSL line cards using the downstream and upstream time windows synchronized to the downstream and upstream time windows of the ISDN line cards for the same cable bundle;

a high-speed data pathway for data transmission to other central offices and to international data networks, the high-speed data pathway connected to the ISDN line cards and to the DSL line cards; and a voice network for voice-call transmission to other central offices and to international voice networks, the voice network connected to the POTS line cards and to the DSL line cards;

wherein telephone lines connected to the DSL line cards are bundled together at the central office with telephone lines connected to the ISDN line cards;

wherein cross-talk interference among DSL telephone lines and ISDN telephone lines occurs in a shared cable bundle outgoing from the central office;

wherein the DSL line cards each further comprise a frequency splitter, coupled to the telephone line, for passing low-frequency signal components to the voice network, but for passing high-frequency signal components to the high-speed data pathway;

wherein the low-frequency signal components comprise a low-frequency voiceband having a frequency range down to zero hertz, but the high-frequency signal components comprise a pass band having a lower frequency limit above the low-frequency voiceband;

wherein the DSL line cards each further comprise:
  symbol encoding means for combining a sequence of binary bits into a symbol representing multiple binary bits for transmission over the telephone line;
  a carrierless amplitude/phase modulator (CAP) filter for generating a transmitted signal representing transmitted data bits within a frequency passband;
  a trellis encoder, coupled to the symbol encoding means, for trellis-code modulation of the data for transmission; and
  a viterbi decoder, coupled to receive data from the telephone line, for decoding symbols encoded by a trellis encoder at the customer premises, whereby the DSL line cards are connected to both the high-speed data pathway and to the voice network, the DSL line cards each terminating a telephone line carrying both voice calls and data transmission and whereby signal components from the telephone line are split by frequency into voice calls and high-speed data transmissions and whereby the low-frequency voiceband for voice calls does not overlap the high-frequency band for data transmission of the DSL line cards and whereby data is compressed for transmission by the DSL line cards.

13. The central office of claim 12 wherein the telephone lines comprise pulp-insulated cables passing more cross-talk interference than plastic-insulated cables of a similar thickness and size,
  whereby the DSL line cards operate with inferior pulp-insulated cables.

14. The central office of claim 13 further comprising:
a reference clock generator for generating a reference clock, the reference clock indicating when the downstream time-window begins and when the upstream time-window begins;
a reference-clock input on each of the ISDN line cards, the ISDN line cards transmitting in response to the reference clock indicating the downstream time-window, but receiving and not transmitting in response to the reference clock indicating the upstream time-window;
a reference-clock input on each of the DSL line cards, the DSL line cards transmitting in response to the reference clock indicating the downstream time-window, but receiving and not transmitting in response to the reference clock indicating the upstream time-window,
whereby the DSL line cards and the ISDN line cards are synchronized by the reference clock.

15. A Time-Compression-Multiplexing Digital-Subscriber-Line (TCM-DSL) modem for use with pulp-insulated cables, the TCM-DSL modem comprising:
  a telephone-line input for terminating a telephone line;
  a frequency splitter for separating low-frequency voice signals from high-frequency data signals, the low-frequency voice signals sent to voice-telephone equipment;
  a receiver receiving the high-frequency data signals in a passband from the frequency splitter, the receiver including a symbol decoder for converting symbols into sequences of bits;
  a transmitter for transmitting high-frequency data signals in the passband to the telephone line input, the transmitter including a symbol encoder for converting sequences of bits into symbols, wherein each symbol represents multiple bits using one of the points in a constellation carrying a phase and an amplitude component;
  a carrierless-amplitude/phase (CAP) filter, coupled to the symbol encoder in the transmitter, for generating the high-frequency data signals in the passband representing transmitted data bits within a desired frequency band;
  a burst-clock input for receiving a burst clock, the burst clock indicating a downstream time-window when ISDN lines at the central office are transmitting during an upstream time-window when the ISDN lines are receiving remotely-transmitted data at the central office;
  timing control means, responsive to the burst clock, for transmitting a frame of data in response to the burst clock during the downstream time-window when the TCM-DSL modem is at a central office, but for transmitting the frame during the upstream time-window when the TCM-DSL modem is at a remote customer site,
  whereby TCM-DSL transmission is synchronized to ISDN transmission to reduce an effect of cross-talk interference.

16. The TCM-DSL modem of claim 15 wherein the burst-clock input is coupled to a burst clock signal of ISDN devices sharing a same cable bundle.

17. The TCM-DSL modem of claim 15 further comprising:
  a burst-clock generator, coupled to the burst-clock input, for generating the burst clock, the burst clock generator comprising:
    an ISDN-line input coupled to an ISDN telephone line;
    a timing extractor for detecting when data is transmitted from the central office on the ISDN telephone line and for generating the burst clock in synchronization to a data burst on the ISDN telephone line.

18. The TCM-DSL modem of claim 15 further comprising:
   a burst-clock generator, coupled to the burst-clock input, for generating the burst clock, the burst clock generator comprising:
   a TCM-DSL-line input coupled to the telephone line;
   an interference detector for detecting crosstalk interference on the DSL line from the ISDN devices; and
   a burst clock generator, connected to the interference detector, for generating a burst clock that is synchronized to bursts of detected crosstalk interference.

19. The TCM DSL modem of claim 18 wherein the burst clock generator further comprises:
   a reference clock input receiving a reference clock, the reference clock having a period equal to a nominal period of a transmit cycle on the ISDN lines; and
   a phase-locker for locking a phase of the reference clock to a phase of the bursts of detected crosstalk interference.

\* \* \* \* \*